United States Patent
Li et al.

(10) Patent No.: US 12,361,189 B2
(45) Date of Patent: Jul. 15, 2025

(54) METHOD, APPARATUS AND DEVICE FOR PREDICTING WALL TEMPERATURE DEVIATION OF HIGH-TEMPERATURE HEATING SURFACE TUBE PANEL OF BOILER

(71) Applicant: CHINA SOUTHERN POWER GRID TECHNOLOGY CO., LTD., Guangdong (CN)

(72) Inventors: Debo Li, Guangdong (CN); Zhihao Chen, Guangdong (CN); Zhaoli Chen, Guangdong (CN); Jinghui Song, Guangdong (CN); Yongxin Feng, Guangdong (CN)

(73) Assignee: CHINA SOUTHERN POWER GRID TECHNOLOGY CO., LTD., Guangzhou (CN)

( * ) Notice: Subject to any disclaimer, the term of this patent is extended or adjusted under 35 U.S.C. 154(b) by 23 days.

(21) Appl. No.: 18/039,217

(22) PCT Filed: Mar. 14, 2022

(86) PCT No.: PCT/CN2022/080606
§ 371 (c)(1),
(2) Date: May 26, 2023

(87) PCT Pub. No.: WO2022/199409
PCT Pub. Date: Sep. 29, 2022

(65) Prior Publication Data
US 2023/0419004 A1    Dec. 28, 2023

(30) Foreign Application Priority Data

Mar. 25, 2021    (CN) .......................... 202110321457.2

(51) Int. Cl.
G06F 30/28    (2020.01)

(52) U.S. Cl.
CPC ................... *G06F 30/28* (2020.01)

(58) Field of Classification Search
CPC .............................. G06F 30/28; G06F 2119/08
See application file for complete search history.

(56) References Cited

U.S. PATENT DOCUMENTS

2020/0191380 A1    6/2020    Park et al.

FOREIGN PATENT DOCUMENTS

| CN | 103752170 | * | 1/2014 |
| CN | 104881714 A | | 9/2015 |

(Continued)

OTHER PUBLICATIONS

Hasini et al. Analysis of Flow and Temperature Distribution in a Full Scale Utility Boiler Using CFD Proceedings of ICEE 3rd International Conference on Energy and Environment, Dec. 2009 (Year: 2009).*

(Continued)

*Primary Examiner* — Rehana Perveen
*Assistant Examiner* — Cuong V Luu (57) ABSTRACT

A method, apparatus and device for predicting wall temperature deviation of a high-temperature heating surface tube panel of a boiler. The method comprises: acquiring factor data that affects wall temperature deviation of a high-temperature heating surface tube panel of a boiler; according to the factor data and a boiler structure, establishing a three-dimensional boiler simulation model in CFD software, and in the boiler simulation model, calculating the swirl intensity of a boiler furnace outlet by using a swirl momentum moment formula, and calculating a wall temperature deviation coefficient of the high-temperature heating surface tube panel of the boiler by using a wall temperature deviation coefficient calculation formula; and performing quadratic fitting processing on the swirl intensity (Continued)

and the wall temperature deviation coefficient, so as to obtain a prediction model. Wall temperature deviation of a high-temperature heating surface tube panel of a boiler can be predicted by means of a prediction model, and the operation of a combustion system of a coal-fired generator set is controlled by means of the wall temperature deviation of the high-temperature heating surface tube panel, thereby solving the problem of a tube wall of the boiler being prone to overheating when high-temperature heating surface tube panels of existing boilers have excessive heat absorption deviation or sudden disturbance occurs.

10 Claims, 3 Drawing Sheets

(56) References Cited

FOREIGN PATENT DOCUMENTS

| CN | 106524118 | A | 3/2017 |
|----|-----------|---|--------|
| CN | 108364094 | * | 2/2018 |
| CN | 108364094 | A | 8/2018 |
| CN | 110929446 | A | 3/2020 |
| CN | 112949226 | A | 6/2021 |
| JP | 2000346304 | A | 12/2000 |

OTHER PUBLICATIONS

International Search Report for PCT/CN2022/080606 mailed Apr. 26, 2022, ISA/CN.

Chen, Nan et al., Distributed Dynamic Mathematical Model & Tube Wall Temperaure Calculation of Rear Platen Superheater, Hubei Electric Power, Aug. 30, 2006, No. 04, ISSN:1006-3986.

Liu, Yulong, et al., The heat load distribution calculation model of flue of Tangential combustion boiler with four corners based on artificial neural network, East China Electric Power, vol. 32, No. 5, May 24, 2004.

Cai, Bin, Research on Tube Bursting and Overheating of The Final Superheater on The 670th Boiler, China Master Dissertations Full-text Database, Sep. 15, 2016.

Liu, Fuguo, et al. Online Temperature Monitoring and Forecasting System for Evaporating Tube Wall in Supercritical Boilers, Electric Power, vol. 46, No. 4, Apr. 5, 2013.

* cited by examiner

METHOD, APPARATUS AND DEVICE FOR PREDICTING WALL TEMPERATURE DEVIATION OF HIGH-TEMPERATURE HEATING SURFACE TUBE PANEL OF BOILER

The present application is a national stage of International Application No. PCT/CN2022/080606, filed on Mar. 14, 2022, which claims priority to Chinese Patent Application No. 202110321457.2, titled "METHOD, APPARATUS AND DEVICE FOR PREDICTING WALL TEMPERATURE DEVIATION OF HIGH-TEMPERATURE HEATING SURFACE TUBE PANEL OF BOILER", filed on Mar. 25, 2021 with the Chinese Patent Office, both of which are incorporated herein by reference in their entireties.

FIELD

The present disclosure relates to the technical field of thermal power generation, and in particular to a method, an apparatus and a device for predicting a wall temperature deviation of a high temperature heating surface tube panel of a boiler.

BACKGROUND

With the rapid development of the electrical power industry in China, the construction of thermal power generation has been developing towards the direction of large capacity and high parameters. Large quantities of supercritical and ultra-supercritical generator sets have been put into service in thermal power generation. The thermal power generation devices include boilers in the power station, in which the pulverized coal tangentially fired furnaces are most widely used. When the pulverized coal tangentially fired furnace is in the operation, the pulverized coal airflow arranged in the four corners of the furnace is injected into the furnace at a certain deflection angle, and a swirling airflow is formed, which rises in a spiral shape. The residual eddy of the flue gas takes away heat energy generated by the boiler. Thus, thermal power generation has low conversion efficiency from thermal energy to electric energy, resulting in waste of resource.

The tangential rotation of the flue gas in the boiler leads to inconsistent parameters, such as the flue gas velocity and temperature, along the furnace width and furnace height of the heating tube panel of the same stage boiler. The high temperature heating surface tube panel of the boiler is exposed to the high temperature and high speed flue gas atmosphere for a long time. Even if heat-resisting material is used on the high temperature heating surface tube panel of the boiler, when the boiler is in the operation, and the heat absorption deviation of the high temperature heating surface tube panel is too large or there is a sudden disturbance, overtemperature of the tube wall of the boiler is easy to occur, resulting in shortening the boiler life, producing overtemperature burst accident, and threatening the safe operation of the power station seriously. Therefore, it is very important to study the distribution of heat absorption deviation of the high temperature heating surface tube panel of the boiler in the process of using the boiler to generate heat energy to realize thermal power generation.

SUMMARY

A method, an apparatus and a device for predicting a wall temperature deviation of a high temperature heating surface tube panel of a boiler is provided according to embodiments of the present disclosure, to solve the conventional technical problem of the overtemperature which is easy to occur on the tube wall of the boiler when the high temperature heating surface tube panel of the boiler has too large heat absorption deviation or there is a sudden disturbance, threatening the safe operation of the power station seriously.

In view of this, the following technical solution is provided according to embodiments of the present disclosure.

A method for predicting a wall temperature deviation of a high temperature heating surface tube panel of a boiler, which is applied to a combustion system of a coal-fired generating unit. The method includes:

obtaining operation data of the combustion system of the coal-fired generating unit, and selecting, from the operation data, data affecting the wall temperature deviation of the high temperature heating surface tube panel of the boiler, as factor data;

establishing a three-dimensional boiler simulation model in CFD software, according to the factor data and a structure of the boiler, and calculating swirl intensity at a furnace outlet of the boiler using a swirl momentum moment formula in the boiler simulation model;

calculating a wall temperature deviation coefficient of the high temperature heating surface tube panel of the boiler using a wall temperature deviation coefficient formula in the boiler simulation model;

performing a quadratic fit on the swirl intensity and the wall temperature deviation coefficient by using Matlab, to obtain a predicting model of the wall temperature deviation of the high temperature heating surface tube panel of the boiler; and using factor data and swirl intensity of a boiler to be predicted, as an input of the predicting model, and obtaining an output of the predicting model as the wall temperature deviation of the high temperature heating surface tube panel of the boiler to be predicted.

In an embodiment, the swirl intensity P at the furnace outlet of the boiler is expressed by a swirl momentum moment, and the swirl momentum moment formula is:

$$P = \left[\sum_{i=1}^{n_1} \rho u_x^2 \Delta x \Delta HL_x + \sum_{j=1}^{n_2} \rho u_z^2 \Delta z \Delta HL_z\right] / 2$$

wherein $\rho$ is a density of flue gas flowing through a furnace of the boiler, $u_x$ is a tangential velocity of the flue gas along an x-axis direction in the boiler simulation model, $u_z$ is a tangential velocity of the flue gas along a z-axis direction in the boiler simulation model, $\Delta x$ is a distance of measuring points of the furnace of the boiler along the x-axis direction, $\Delta z$ is a distance of the measuring points of the furnace of the boiler along the z-axis direction, $\Delta H$ is a unit length of the furnace of the boiler, $L_x$ is a distance between the measuring point of the furnace of the boiler and a center of the furnace of the boiler along the x-axis direction, $L_z$ is a distance between the measuring point of the furnace of the boiler and the center of the furnace of the boiler along the z-axis direction, $n_1$ is the number of measuring points along the x-axis direction, and $n_2$ is the number of measuring points along the z-axis direction.

In an embodiment, the wall temperature deviation coefficient formula is:

$$M_T = \frac{T_{ave} + 3\sqrt{\frac{1}{N-1}\sum_{i=1}^{N}(T_i - T_{ave})^2}}{T_{ave}}$$

wherein $T_{ave}$ is an average value of outer wall temperatures at N temperature calculating points of the high temperature heating surface tube panel of the boiler, $T_i$ is an outer wall temperature at the i-th temperature calculating point of the high temperature heating surface tube panel of the boiler, N is the number of temperature calculating points, and $M_T$ is the wall temperature deviation coefficient of the high temperature heating surface tube panel of the boiler.

In an embodiment, before calculating a wall temperature deviation coefficient of the high temperature heating surface tube panel of the boiler using a wall temperature deviation coefficient formula in the boiler simulation model, the method further includes: calculating an outer wall temperature of the high temperature heating surface tube panel of the boiler using an outer wall temperature calculating formula, wherein the outer wall temperature calculating formula is:

$$T = t_f + J_n \frac{\beta}{\alpha_2} q_w + \overline{Jq_w} \frac{\delta}{\lambda} \frac{2\beta}{\beta+1}$$

wherein $t_f$ is a temperature of working substance at the temperature calculating point in the furnace of the boiler, $J_n$ is a heat current-sharing coefficient of an inner wall of a pipeline in the furnace of the boiler, $\beta$ is a ratio of an outer diameter to an inner diameter of the pipeline in the furnace of the boiler, $q_w$ is a heat flow density of an outer wall at the temperature calculating point of the furnace of the boiler, $\alpha_2$ is a heat transfer coefficient between the inner wall of the pipeline and the working substance at the temperature calculating point of the furnace of the boiler, $\overline{J}$ is an average heat flow current-sharing coefficient of the pipeline in the furnace of the boiler along a thickness direction of the pipeline, $\delta$ is a thickness of a wall of the pipeline in the furnace of the boiler, $\lambda$ is a metal thermal conductivity coefficient of the wall of the pipeline in the furnace of the boiler, and T is an outer wall temperature at the temperature calculating point of the high temperature heating surface tube panel of the boiler.

In an embodiment, before calculating a wall temperature deviation coefficient of the high temperature heating surface tube panel of the boiler using a wall temperature deviation coefficient formula in the boiler simulation model, the method further includes: obtaining the temperature calculating points of the pipeline in the furnace of the boiler.

An apparatus for predicting a wall temperature deviation of a high temperature heating surface tube panel of a boiler is provided according to the present disclosure, which is applied to a combustion system of a coal-fired generating unit. The apparatus includes a data acquiring module, a first calculating module, a second calculating module, a predicting model module and an outputting module.

The data acquiring module is configured to obtain operating data of the combustion system of the coal-fired generating unit; and select, from the operation data, data affecting the wall temperature deviation of the high temperature heating surface tube panel of the boiler, as factor data.

The first calculating module is configured to establish a three-dimensional boiler simulation model in CFD software, according to the factor data and a structure of the boiler, and calculate swirl intensity at a furnace outlet of the boiler using a swirl momentum moment formula in the boiler simulation model.

The second calculating module is configured to calculate a wall temperature deviation coefficient of the high temperature heating surface tube panel of the boiler using a wall temperature deviation coefficient formula in the boiler simulation model.

The predicting model module is configured to perform a quadratic fit on the swirl intensity and the wall temperature deviation coefficient by using Matlab, to obtain a predicting model of the wall temperature deviation of the high temperature heating surface tube panel of the boiler.

The outputting module is configured to use factor data and swirl intensity of a boiler to be predicted, as an input of the predicting model, and obtain an output of the predicting model as the wall temperature deviation of the high temperature heating surface tube panel of the boiler to be predicted.

In an embodiment, the first calculating module is configured to express the swirl intensity at the furnace outlet of the boiler by a swirl momentum moment, the swirl momentum moment formula is:

$$P = \left[\sum_{i=1}^{n_1} \rho u_x^2 \Delta x \Delta H L_x + \sum_{j=1}^{n_2} \rho u_z^2 \Delta z \Delta H L_z\right] / 2$$

wherein $\rho$ is a density of flue gas flowing through a furnace of the boiler, $u_x$ is a tangential velocity of the flue gas along an x-axis direction in a boiler simulation model, $u_z$ is a tangential velocity of the flue gas along a z-axis direction in the boiler simulation model, $\Delta x$ is a distance of measuring points of the furnace of the boiler along the x-axis direction, $\Delta z$ is a distance of the measuring points of the furnace of the boiler along the z-axis direction, $\Delta H$ is a unit length of the furnace of the boiler, $L_x$ is a distance between the measuring point of the furnace of the boiler and a center of the furnace of the boiler along the x-axis direction, $L_z$ is a distance between the measuring point of the furnace of the boiler and the center of the furnace of the boiler along the z-axis direction, $n_1$ is the number of measuring points along the x-axis direction, and $n_2$ is the number of measuring points along the z-axis direction.

In an embodiment, in the second calculating module, the wall temperature deviation coefficient formula is:

$$M_T = \frac{T_{ave} + 3\sqrt{\frac{1}{N-1}\sum_{i=1}^{N}(T_i - T_{ave})^2}}{T_{ave}}$$

wherein $T_{ave}$ is an average value of outer wall temperatures at N temperature calculating points of the high temperature heating surface tube panel of the boiler, $T_i$ is an outer wall temperature at the i-th temperature calculating point of the high temperature heating surface tube panel of the boiler, N is the number of temperature calculating points, and $M_T$ is the wall temperature deviation coefficient of the high temperature heating surface tube panel of the boiler.

In an embodiment, before calculating a wall temperature deviation coefficient of the high temperature heating surface tube panel of the boiler using a wall temperature deviation coefficient formula in the boiler simulation model, the second calculating module is further configured to: calculate an outer wall temperature of the high temperature heating surface tube panel of the boiler using an outer wall temperature calculating formula, wherein the outer wall temperature calculating formula is:

$$T = t_f + J_n \frac{\beta}{\alpha_2} q_w + \overline{J} q_w \frac{\delta}{\lambda} \frac{2\beta}{\beta+1}$$

wherein $t_f$ is a temperature of working substance at the temperature calculating point in the furnace of the boiler, $J_n$ is a heat current-sharing coefficient of an inner wall of a pipeline in the furnace of the boiler, $\beta$ is a ratio of an outer diameter to an inner diameter of the pipeline in the furnace of the boiler, $q_w$ is a heat flow density of an outer wall at the temperature calculating point of the furnace of the boiler, $\alpha_2$ is a heat transfer coefficient between the inner wall of the pipeline and the working substance at the temperature calculating point of the furnace of the boiler, $\overline{J}$ is an average heat flow current-sharing coefficient of the pipeline in the furnace of the boiler along a thickness direction of the pipeline, $\delta$ is a thickness of a wall of the pipeline in the furnace of the boiler, $\lambda$ is a metal thermal conductivity coefficient of the wall of the pipeline in the furnace of the boiler, and $T$ is an outer wall temperature at the temperature calculating point of the high temperature heating surface tube panel of the boiler.

A device for predicting a wall temperature deviation of a high temperature heating surface tube panel of a boiler is further provided by the present disclosure. The device includes a processor and a memory.

The memory is configured to store program codes, and transmit the program codes to the processor.

The processor is configured to execute instructions in the program codes to implement the above method for predicting the wall temperature deviation of the high temperature heating surface tube panel of the boiler.

According to the above technical solutions, an embodiment of the present disclosure has following benefits. In the method, the apparatus and the device for predicting the wall temperature deviation of the high temperature heating surface tube panel of the boiler, factor data affecting the wall temperature deviation of the high temperature heating surface tube panel of the boiler are obtained. The three-dimensional boiler simulation model is established in CFD software according to the factor data and the structure of the boiler. In the boiler simulation model, the swirl intensity at the furnace outlet of the boiler is calculated by using the swirl momentum moment formula, and the wall temperature deviation coefficient of the high temperature heating surface tube panel of the boiler is calculated by using the wall temperature deviation coefficient formula. A quadratic fit is performed on the swirl intensity and the wall temperature deviation coefficient by using Matlab, to obtain a predicting model. Through the predicting model, the wall temperature deviation of the high temperature heating surface tube panel of the boiler may be predicted. The operation of the combustion system of the coal-fired generating unit is controlled based on the wall temperature deviation of the high temperature heating surface tube panel of the boiler. Thus, the conventional technical problem can be solved, in which an overtemperature is easy to occur on the tube wall of the boiler when the high temperature heating surface tube panel of the boiler has too large heat absorption deviation or there is a sudden disturbance, threatening the safe operation of the power station seriously.

BRIEF DESCRIPTION OF THE DRAWINGS

In order to more clearly explain technical solutions in the embodiments of the present disclosure or in the conventional technology, the accompanying drawings referred to for describing the embodiments or the conventional technology are briefly described hereinafter. Apparently, the accompanying drawings in the following description are only embodiments of the present disclosure. Other drawings may be obtained for those of ordinary skill in the art based on the provided drawings without any creative efforts.

DETAILED DESCRIPTION

To make the purpose, features and benefits are more obvious and understandable, the technical solutions in the embodiments of the present disclosure will be clearly and completely described hereinafter with reference to the drawings in the embodiments according to the present disclosure. Apparently, the described embodiments are only a part of the embodiments of the present disclosure, but not all of the embodiments. Based on the embodiments in the present disclosure, all other embodiments obtained by those of ordinary skill in the art without creative effects fall within the protection scope of the present disclosure.

A method, an apparatus and a device for predicting a wall temperature deviation of a high temperature heating surface tube panel of a boiler are provided according to embodiments of the present disclosure, to solve the conventional technical problem of the overtemperature which is easy to occur on the tube wall of the boiler when the high temperature heating surface tube panel of the boiler has too large heat absorption deviation or there is a sudden disturbance, threatening the safe operation of the power station seriously.

First Embodiment

Figure 1:
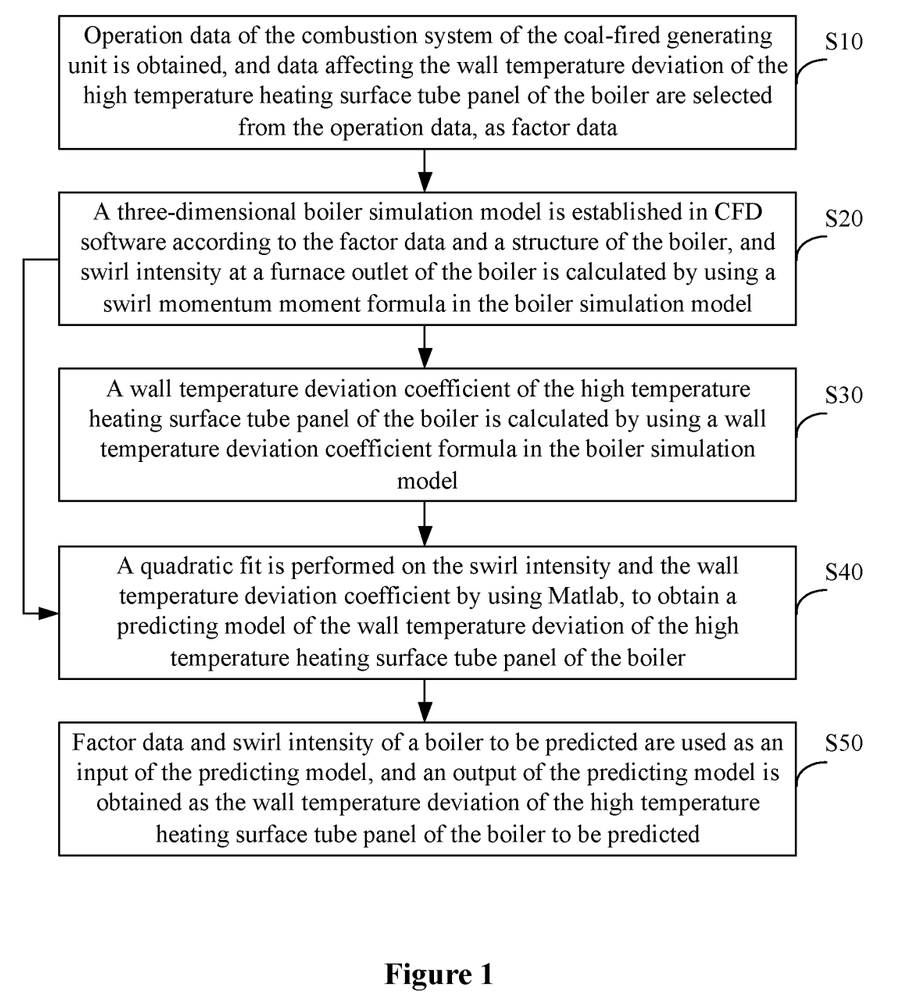
FIG. 1 is a flow chart of steps of a method for predicting a wall temperature deviation of a high temperature heating surface tube panel of a boiler according to an embodiment of the present disclosure.

FIG. 1 is a flow chart of steps of a method for predicting a wall temperature deviation of a high temperature heating surface tube panel of a boiler according to an embodiment of the present disclosure.

According to FIG. 1, the method for predicting the wall temperature deviation of the high temperature heating surface tube panel of the boiler is applied to a combustion system of a coal-fired generating unit. The method includes follow steps.

In S10, operation data of the combustion system of the coal-fired generating unit is obtained, and data affecting the wall temperature deviation of the high temperature heating surface tube panel of the boiler are selected from the operation data, as factor data.

It should be noted that the data affecting the wall temperature deviation of the high temperature heating surface tube panel of the boiler are selected from the operation data of the combustion system of the coal-fired generating unit. The factor data may be operating load of the boiler, a nozzle swing angle of the boiler, a nozzle swing angle of over fire air, total air volume, primary air volume ratio, and over fire air volume ratio of the over fire air, etc. In an embodiment, the factor data include multiple groups of data affecting the wall temperature deviation of the high temperature heating surface tube panel of the boiler which are obtained by the combustion system of the coal-fired generating unit under different operating conditions.

In S20, a three-dimensional boiler simulation model is established in CFD software according to the factor data and a structure of the boiler, and swirl intensity at a furnace outlet of the boiler is calculated by using a swirl momentum moment formula in the boiler simulation model.

It should be noted that the three-dimensional flow field and temperature field of the boiler combustion are restored in the CFD software, according to the structure of the boiler and the factors affecting the wall temperature deviation of the high temperature heating surface tube panel of the boiler under different operating conditions. The three-dimensional boiler simulation model established in the CFD software takes a width direction of the boiler as an x-axis direction, a height direction of the boiler as a y-axis direction, and a depth direction of the boiler as a z-axis direction. A model ratio of the established boiler simulation model to a model established in the three-dimensional rectangular coordinate system is 1:1. The boiler simulation model established in CFD software is divided into different grids according to the structural features and the boiler pipeline. For example, a connection end of the boiler pipelines is indicated as a node, a connection pipe between the nodes is indicated as a section, and then an independent basic loop of a boiler fluid network is composed of nodes and sections. In an embodiment, a node of the pipeline in the furnace of the boiler may be used as a temperature calculating point.

Figure 2:
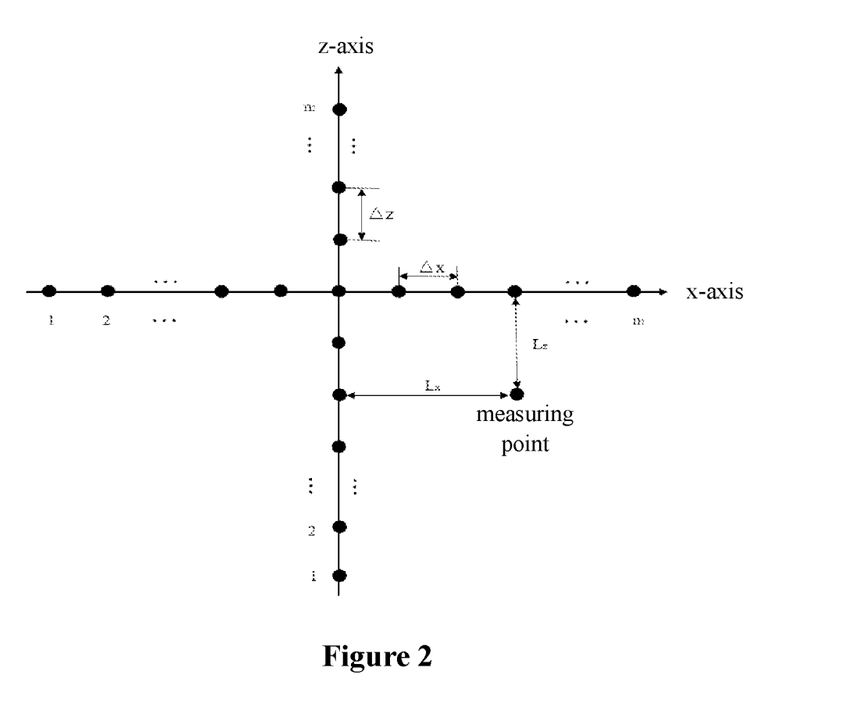
FIG. 2 is a schematic diagram of a calculation of swirl intensity in a method for predicting a wall temperature deviation of a high temperature heating surface tube panel of a boiler according to an embodiment of the present disclosure.

FIG. 2 is a schematic diagram of a calculation of swirl intensity in a method for predicting a wall temperature deviation of the high temperature heating surface tube panel of a boiler according to an embodiment of the present disclosure.

According to FIG. 1 and FIG. 2, in the step S20 in an embodiment of the present disclosure, the simulation model of the boiler is simulated by using the factor data in CFD software, the velocity in the furnace of the boiler in the three-dimensional rectangular coordinate system is obtained. Then, based on the data of the measuring points at the furnace of the boiler in the three-dimensional index coordinate system, the swirl intensity of the furnace outlet of the boiler is calculated by using the swirl momentum moment formula.

It should be noted that in the embodiment, the swirl intensity P at the furnace outlet of the boiler is expressed by a swirl momentum moment, the swirl momentum moment formula is:

$$P = \left[\sum_{i=1}^{n_1}\rho u_x^2 \Delta x \Delta HL_x + \sum_{j=1}^{n_2}\rho u_z^2 \Delta z \Delta HL_z\right]/2$$

wherein $\rho$ is a density of flue gas flowing through the furnace of the boiler, $u_x$ is a tangential velocity of the flue gas along an x-axis direction in a boiler simulation model, $u_z$ is a tangential velocity of the flue gas along a z-axis direction in the boiler simulation model, $\Delta x$ is a distance of measuring points of the furnace of the boiler along the x-axis direction, $\Delta z$ is a distance of the measuring points of the furnace of the boiler along the z-axis direction, $\Delta H$ is a unit length of the furnace of the boiler, $L_x$ is a distance between the measuring point of the furnace of the boiler and a center of the furnace of the boiler along the x-axis direction, $L_z$ is a distance between the measuring point of the furnace of the boiler and the center of the furnace of the boiler along the z-axis direction, $n_1$ is the number of measuring points along the x-axis direction, and $n_2$ is the number of measuring points along the z-axis direction.

In S30, a wall temperature deviation coefficient of the high temperature heating surface tube panel of the boiler is calculated by using a wall temperature deviation coefficient formula in the boiler simulation model.

It should be noted that the boiler simulation model is obtained in CFD software according to the step S20. The outer wall temperatures at each temperature calculating point of the furnace of the boiler are calculated according to the boiler simulation model, and then the wall temperature deviation coefficient of the high temperature heating surface tube panel of the boiler is calculated by using the wall temperature deviation coefficient formula.

In S40, a quadratic fit is performed on the swirl intensity and the wall temperature deviation coefficient by using Matlab, to obtain a predicting model of the wall temperature deviation of the high temperature heating surface tube panel of the boiler.

It should be noted that the predicting model is built in Matlab according to the swirl intensity obtained in the step S20 and the wall temperature deviation coefficient obtained in the step S30. The predicting model may predict the wall temperature deviation of the high temperature heating surface tube panel of the boiler under any operating condition. In an embodiment, the quadratic fit is performed on the swirl intensity and the wall temperature deviation coefficient by using Matlab, to obtain an expression of the predicting model $M_T=k_2P^2+k_1P+k_n$. $k_0$ is a coefficient of a constant term, $k_1$ is a linear coefficient, $k_2$ is a quadratic coefficient, and M is the wall temperature deviation coefficient of the high temperature heating surface tube panel of the boiler.

In S50, factor data and swirl intensity of a boiler to be predicted are used as an input of the predicting model, and an output of the predicting model is obtained as the wall temperature deviation of the high temperature heating surface tube panel of the boiler to be predicted.

It should be noted that the factor data of the boiler to be predicted are processed by the step S20 and the step S30 to obtain corresponding swirl intensity and wall temperature deviation coefficient. The obtained swirl intensity and wall temperature deviation coefficient are input into predicting model in the step S40 to obtain the wall temperature deviation of the high temperature heating surface tube panel of the boiler to be predicted. The operation of the combustion system of the coal-fired generating unit is controlled based on the wall temperature deviation of the high temperature heating surface tube panel, avoiding the conventional problem of the overtemperature which is easy to occur at the tube wall of the boiler.

In the method for predicting the wall temperature deviation of the high temperature heating surface tube panel of the boiler, factor data affecting the wall temperature deviation of the high temperature heating surface tube panel of the boiler are obtained. The three-dimensional boiler simulation model is established in CFD software according to the factor data and the structure of the boiler. In the boiler simulation model, the swirl intensity at the furnace outlet of the boiler is calculated by using the swirl momentum moment formula, and the wall temperature deviation coefficient of the high temperature heating surface tube panel of the boiler is calculated by using the wall temperature deviation coefficient formula. A quadratic fit is performed on the swirl intensity and the wall temperature deviation coefficient by using Matlab, to obtain a predicting model. Through the predicting model, the wall temperature deviation of the high temperature heating surface tube panel of the boiler may be predicted. The operation of the combustion system of the coal-fired generating unit is controlled based on the wall temperature deviation of the high temperature heating surface tube panel of the boiler. Thus, the conventional technical problem can be solved, in which an overtemperature is easy to occur on the tube wall of the boiler when the high temperature heating surface tube panel of the boiler has too large heat absorption deviation or there is a sudden disturbance, threatening the safe operation of the power station seriously.

In an embodiment of the present disclosure, in the step S30, before calculating the wall temperature deviation coefficient of the high temperature heating surface tube panel of the boiler using the wall temperature deviation coefficient formula in the boiler simulation model, the method further includes: calculating an outer wall temperature of the high temperature heating surface tube panel of the boiler using an outer wall temperature calculating formula.

The outer wall temperature calculating formula is:

$$T = t_f + J_n \frac{\beta}{\alpha_2} q_w + \bar{J} q_w \frac{\delta}{\lambda} \frac{2\beta}{\beta+1}$$

wherein $t_f$ is a temperature of working substance at the temperature calculating point in the furnace of the boiler, $J_n$ is a heat current-sharing coefficient of an inner wall of a pipeline in the furnace of the boiler, $\beta$ is a ratio of an outer diameter to an inner diameter of the pipeline in the furnace of the boiler, $q_w$ is a heat flow density of the outer wall at the temperature calculating point of the furnace of the boiler, $\alpha_2$ is a heat transfer coefficient between the inner wall of the pipeline and the working substance at the temperature calculating point of the furnace of the boiler, $\bar{J}$ is an average heat flow current-sharing coefficient of the pipeline in the furnace of the boiler along a thickness direction of the pipeline, $\delta$ is a thickness of a wall of the pipeline in the furnace of the boiler, $\lambda$ is a metal thermal conductivity coefficient of the wall of the pipeline in the furnace of the boiler, and T is an outer wall temperature at the temperature calculating point of the high temperature heating surface tube panel of the boiler.

It should be noted that the boiler simulation model is obtained in CFD software to simulate the operating conditions. It can be seen that the outer wall temperature of the high temperature heating surface tube panel of the boiler relates to the inner diameter and outer diameter of the pipe in the furnace of the boiler, fluid temperature, heat transfer coefficient, thermal conductivity and heat flow coefficient. In an embodiment, the outer wall temperatures at respective temperature calculating points of the pipe in the furnace of the boiler are calculated according to the outer wall temperature calculating formula. Then, the wall temperature deviation coefficient under the simulation condition of the operating condition is obtained by using the wall temperature deviation coefficient calculation formula based on the outer wall temperatures of respective temperature calculating points. The wall temperature deviation coefficient formula is:

$$M_T = \frac{T_{ave} + 3\sqrt{\frac{1}{N-1}\sum_{i=1}^{N}(T_i - T_{ave})^2}}{T_{ave}}$$

wherein $T_{ave}$ is an average value of outer wall temperatures at N temperature calculating points of the high temperature heating surface tube panel of the boiler, $T_i$ is an outer wall temperature of the i-th temperature calculating point of the high temperature heating surface tube panel of the boiler, N is the number of temperature calculating points, and $M_T$ is the wall temperature deviation coefficient of the high temperature heating surface tube panel of the boiler.

In an embodiment, in a fluid network of the boiler simulation model in CFD software, the temperature of the working substance at the temperature calculating point in the pipe of the furnace of the boiler is determined by an enthalpy value of the working substance. In the heat balance, the expression for determining the enthalpy value of the working substance at the temperature calculating point in the pipe of the furnace of the boiler is $h_j(i,j,k) = h'(i,j,k) + \Delta h(i,j,k)$, wherein $h'(i,j,k)$ is the enthalpy value of the working substance at the wellhead of the pipe of the furnace of the boiler at the temperature calculating point, $\Delta h(i,j,k)$ is an enthalpy increase of the working substance at the temperature calculating point in the pipe of the furnace of the boiler.

Second Embodiment

Figure 3:
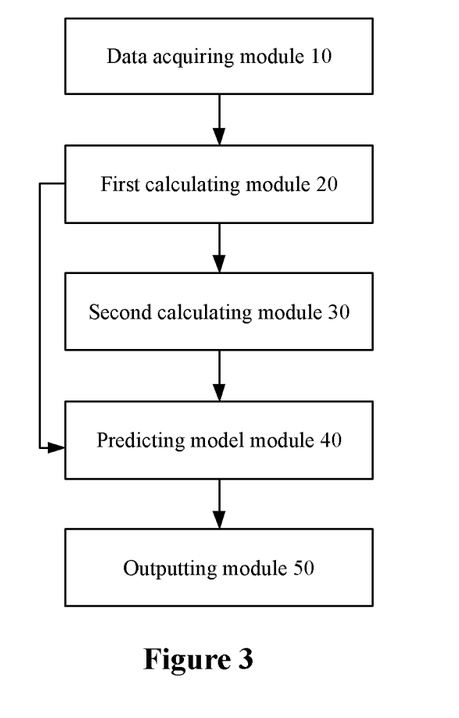
FIG. 3 is a schematic structural diagram of an apparatus for predicting a wall temperature deviation of a high temperature heating surface tube panel of a boiler according to an embodiment of the present disclosure.

FIG. 3 is a schematic structural diagram of an apparatus for predicting a wall temperature deviation of a high temperature heating surface tube panel of a boiler according to an embodiment of the present disclosure.

As shown in FIG. 3, an apparatus for predicting a wall temperature deviation of a high temperature heating surface tube panel of a boiler is provided according to an embodiment of the present disclosure, which is applied to a combustion system of a coal-fired generating unit. The apparatus includes a data acquiring module 10, a first calculating module 20, a second calculating module 30, a predicting model module 40 and an outputting module 50.

The data acquiring module 10 is configured to obtain operating data of the combustion system of the coal-fired generating unit; and select, from the operation data, data affecting the wall temperature deviation of the high temperature heating surface tube panel of the boiler from the operating data, as factor data.

The first calculating module 20 is configured to establish a three-dimensional boiler simulation model in CFD software, according to the factor data and a structure of the boiler; and calculate swirl intensity at a furnace outlet of the boiler using a swirl momentum moment formula in the boiler simulation model.

The second calculating module 30 is configured to calculate a wall temperature deviation coefficient of the high temperature heating surface tube panel of the boiler using the wall temperature deviation coefficient formula in the boiler simulation model.

The predicting model module 40 is configured to perform a quadratic fit on the swirl intensity and the wall temperature deviation coefficient by using Matlab, to obtain a predicting model of the wall temperature deviation of the high temperature heating surface tube panel of the boiler.

The outputting module 50 is configured to use factor data and swirl intensity of a boiler to be predicted as an input of the predicting model, and obtain an output of the predicting model as the wall temperature deviation of the high temperature heating surface tube panel of the boiler to be predicted.

In an embodiment of the present disclosure, the first calculating module is configured to express the swirl intensity at the furnace outlet of the boiler by a swirl momentum moment, where the swirl momentum moment formula is:

$$P = \left[ \sum_{i=1}^{n_1} \rho u_x^2 \Delta x \Delta H L_x + \sum_{j=1}^{n_2} \rho u_z^2 \Delta z \Delta H L_z \right] / 2$$

wherein $\rho$ is a density of flue gas flowing through a furnace of the boiler, $u_x$ is a tangential velocity of the flue gas along an x-axis direction in a boiler simulation model, $u_z$ is a tangential velocity of the flue gas along a z-axis direction in the boiler simulation model, $\Delta x$ is a distance of measuring points of the furnace of the boiler along the x-axis direction, $\Delta z$ is a distance of the measuring points of the furnace of the boiler along the z-axis direction, $\Delta H$ is a unit length of the furnace of the boiler, $L_x$ is a distance between the measuring point of the furnace of the boiler and a center of the furnace of the boiler along the x-axis direction, $L_z$ is a distance between the measuring point of the furnace of the boiler and the center of the furnace of the boiler along the z-axis direction, $n_1$ is the number of measuring points along the x-axis direction, and $n_2$ is the number of measuring points along the z-axis direction.

In an embodiment of the present disclosure, in the second calculating module, the wall temperature deviation coefficient formula is:

$$M_T = \frac{T_{ave} + 3\sqrt{\frac{1}{N-1}\sum_{i=1}^{N}(T_i - T_{ave})^2}}{T_{ave}}$$

wherein $T_{ave}$ is an average value of outer wall temperatures at N temperature calculating points of the high temperature heating surface tube panel of the boiler, $T_i$ is an outer wall temperature at the i-th temperature calculating point of the high temperature heating surface tube panel of the boiler, N is the number of temperature calculating points, and $M_T$ is the wall temperature deviation coefficient of the high temperature heating surface tube panel of the boiler.

In an embodiment of the present disclosure, before calculating the wall temperature deviation coefficient of the high temperature heating surface tube panel of the boiler using the wall temperature deviation coefficient formula in the boiler simulation model, the second calculating module is further configured to: calculate an outer wall temperature of the high temperature heating surface tube panel of the boiler using an outer wall temperature calculating formula, where the outer wall temperature calculating formula is:

$$T = t_f + J_n \frac{\beta}{\alpha_2} q_w + \overline{J} q_w \frac{\delta}{\lambda} \frac{2\beta}{\beta+1}$$

wherein $t_f$ is a temperature of working substance at the temperature calculating point in the furnace of the boiler, $J_n$ is a heat current-sharing coefficient of an inner wall of a pipeline in the furnace of the boiler, $\beta$ is a ratio of an outer diameter to an inner diameter of the pipeline in the furnace of the boiler, $q_w$ is a heat flow density of an outer wall at the temperature calculating point of the furnace of the boiler, $\alpha_2$ is a heat transfer coefficient between the inner wall of the pipeline and the working substance at the temperature calculating point of the furnace of the boiler, $\overline{J}$ is an average heat flow current-sharing coefficient of the pipeline in the furnace of the boiler along a thickness direction of the pipeline, $\delta$ is a thickness of a wall of the pipeline in the furnace of the boiler, $\lambda$ is a metal thermal conductivity coefficient of the wall of the pipeline in the furnace of the boiler, and T is an outer wall temperature at the temperature calculating point of the high temperature heating surface tube panel of the boiler.

It should be noted that the modules in the apparatus according to the second embodiment correspond to the steps of the method according to the first embodiment. The steps of the method in the first embodiment are illustrated in detail in the first embodiment, and thus the modules in the apparatus in the second embodiment are not illustrated in detail herein.

Third Embodiment

A device for predicting a wall temperature deviation of a high temperature heating surface tube panel of a boiler is provided according to an embodiment of the present disclosure. The device includes: a processor and a memory.

The memory is configured to store program codes, and transmit the program codes to the processor.

The processor is configured to execute instructions in the program codes to implement the method for predicting the wall temperature deviation of the high temperature heating surface tube panel of the boiler.

It should be noted that the processor is configured to execute the instructions in the program codes to implement the steps in an embodiment of the method for predicting the temperature deviation of the high temperature heating surface tube panel of the boiler. Alternatively, the processor implements the function of each module/unit in the above embodiments of system/apparatus when executing the computer program.

For example, the computer program may be divided into one or more modules/units. One or more modules/units are stored in memory and executed by the processor to complete this application. One or more modules/units may be a series of computer program instruction segments that may carry out the specific functions, which are used to describe the execution process of the computer program in terminal devices.

The terminal device may be desktop computers, laptops, handheld computers and cloud servers, etc. The terminal device may include, but are not limited to, a processor and a memory. Those skilled in the art may understand that the terminal device is not limited therein. The terminal device may include more or less components than the diagram, or combine some components, or different components. For example, the terminal device may also include an input and output device, a network access device, bus, etc.

The processor may be Central Processing Unit (CPU), which may also be other general-purpose processors, Digital Signal Processor (DSP), Application Specific Integrated Circuit (ASIC), Field-Programmable Gate Array (FPGA) or other programmable logic devices, discrete gates or transistor logic devices, discrete hardware components, etc. The general-purpose processor may be a microprocessor, or the processor may be any conventional processor.

The memory may be an internal storage unit of a terminal device, such as a hard disk or memory of a terminal device. Memory may also be an external storage device of the terminal device, such as plug-in hard disk, Smart Media Card (SMC), Secure Digital (SD) card, Flash Card, etc. Further, the memory may include both an internal storage unit of the terminal device and an external storage device. The memory is used to store computer programs and other programs and data required by terminal device. The memory may also be used to store data that has been output or is to be output temporarily.

Those skilled in the art may clearly understand, for convenient and simple description, the specific working process of the system, device and unit described above may refer to the corresponding process in the above method in the embodiment, which is not repeated here.

In the embodiments provided in the present disclosure, it should be understood that the disclosed system, apparatus and method may be realized in other ways. For example, the apparatus in an embodiment described above is only schematic. For example, the division of the unit is only a logical function division, and it may be divided in other way in the actual implementation, such as a plurality of units or components may be combined or may be integrated into another system, or some features may be ignored or not executed. On the other hand, the mutual coupling or direct coupling or communication connection shown or discussed may be indirect coupling or communication connection through some interfaces, apparatuses or units, which may be electrical, mechanical or in other forms.

The units described as separation components may or may not be physically separated, and the components shown as units may or may not be physical units, i.e. may be located in one place or may be distributed over multiple network units. Some or all of these units may be selected according to actual requirements to achieve the purpose of the solution in an embodiment.

In addition, each functional unit in each embodiment in the present disclosure may be integrated in a processing unit, or each unit may exist alone physically, or two or more units may be integrated in one unit. The above integrated unit may be realized in the form of hardware or software functional units.

The integrated unit may be stored in a computer readable storage medium if implemented as a software function unit and sold or used as an independent product. Based on this understanding, the technical solution of the present disclosure or the part that contributes to the existing technology or the whole or part of the technical solution may be embodied in the form of a software product, which is stored in a storage medium and includes several instructions to enable a computer device (which may be a personal computer, server, or network device, etc.) to perform all or part of the method described in each embodiment of the present disclosure. The aforementioned storage media includes: U disk, mobile hard disk, Read-Only Memory (ROM), Random Access Memory (RAM), disk or disc and other media that may store program.

The foregoing embodiments are only used to illustrate the technical solution in the present disclosure, which should not be understood as limitation to the present disclosure. Those skilled in the art should understand that modifications or various equivalent substitutions to part of the technical features can be made to the technical solutions of the present disclosure, and these substitutions or modifications are not deviating from the spirit and scope of the present disclosure.

The invention claimed is:

1. A method for predicting a wall temperature deviation of a high temperature heating surface tube panel of a boiler, applied to a combustion system of a coal-fired generating unit, wherein the method comprises:
   obtaining operation data of the combustion system of the coal-fired generating unit; and selecting, from the operation data, data affecting the wall temperature deviation of the high temperature heating surface tube panel of the boiler, as factor data;
   establishing a three-dimensional boiler simulation model in CFD software according to the factor data and a structure of the boiler, and calculating swirl intensity at a furnace outlet of the boiler using a swirl momentum moment formula in the boiler simulation model;
   calculating a wall temperature deviation coefficient of the high temperature heating surface tube panel of the boiler using a wall temperature deviation coefficient formula in the boiler simulation model;
   performing a quadratic fit on the swirl intensity and the wall temperature deviation coefficient, to obtain a predicting model of the wall temperature deviation of the high temperature heating surface tube panel of the boiler;
   using the factor data and the swirl intensity of the boiler as an input of the predicting model, and obtaining an output of the predicting model as the wall temperature deviation of the high temperature heating surface tube panel of the boiler; and
   controlling an operation of the combustion system of the coal-fired generating unit based on the wall temperature deviation of the high temperature heating surface tube panel of the boiler, to avoid an overtemperature on a tube wall of the boiler.

2. The method for predicting the wall temperature deviation of the high temperature heating surface tube panel of the boiler according to claim 1, wherein the swirl intensity P at the furnace outlet of the boiler is expressed by swirl momentum moment, and the swirl momentum moment formula is:

$$P = \left[\sum_{i=1}^{n_1} \rho u_x^2 \Delta x \Delta HL_x + \sum_{j=1}^{n_2} \rho u_z^2 \Delta z \Delta HL_z\right]/2$$

wherein $\rho$ is a density of flue gas flowing through a furnace of the boiler, $u_x$ is a tangential velocity of the flue gas along an x-axis direction in the boiler simulation model, $u_z$ is a tangential velocity of the flue gas along a z-axis direction in the boiler simulation model, $\Delta x$ is a distance of measuring points of the furnace of the boiler along the x-axis direction, $\Delta z$ is a distance of the measuring points of the furnace of the boiler along the z-axis direction, $\Delta H$ is a unit length of the furnace of the boiler, $L_x$, is a distance between the measuring point of the furnace of the boiler and a center of the furnace of the boiler along the x-axis direction, $L_z$, is a distance between the measuring point of the furnace of the boiler and the center of the furnace of the boiler along the z-axis direction, $n_1$ is the number of measuring points along the x-axis direction, and $n_2$ is the number of measuring points along the z-axis direction.

3. The method for predicting the wall temperature deviation of the high temperature heating surface tube panel of the boiler according to claim 1, wherein the wall temperature deviation coefficient formula is:

$$M_T = \frac{T_{ave} + 3\sqrt{\frac{1}{N-1}\sum_{i=1}^{N}(T_i - T_{ave})^2}}{T_{ave}}$$

wherein $T_{ave}$ is an average value of outer wall temperatures at N temperature calculating points of the high temperature heating surface tube panel of the boiler, $T_i$ is an outer wall temperature at an i-th temperature calculating point of the high temperature heating surface tube panel of the boiler, N is the number of temperature calculating points, and $M_T$ is the wall temperature deviation coefficient of the high temperature heating surface tube panel of the boiler.

4. The method for predicting the wall temperature deviation of the high temperature heating surface tube panel of the boiler according to claim 3, wherein before calculating the wall temperature deviation coefficient of the high temperature heating surface tube panel of the boiler using the wall temperature deviation coefficient formula in the boiler simulation model, the method further comprises:

calculating an outer wall temperature of the high temperature heating surface tube panel of the boiler using an outer wall temperature calculating formula, wherein the outer wall temperature calculating formula is:

$$T = t_f + J_n \frac{\beta}{\alpha_2} q_w + \overline{J} q_w \frac{\delta}{\lambda} \frac{2\beta}{\beta+1}$$

wherein $t_f$ is a temperature of working substance at the temperature calculating point in the furnace of the boiler, $J_n$ is a heat current-sharing coefficient of an inner wall of a pipeline in the furnace of the boiler, $\beta$ is a ratio of an outer diameter to an inner diameter of the pipeline in the furnace of the boiler, $q_w$ is a heat flow density of an outer wall at the temperature calculating point of the furnace of the boiler, $\alpha_2$ is a heat transfer coefficient between the inner wall of the pipeline and the working substance at the temperature calculating point of the furnace of the boiler, $\overline{J}$ is an average heat flow current-sharing coefficient of the pipeline in the furnace of the boiler along a thickness direction of the pipeline, $\delta$ is a thickness of a wall of the pipeline in the furnace of the boiler, $\lambda$ is a metal thermal conductivity coefficient of the wall of the pipeline in the furnace of the boiler, and T is an outer wall temperature at the temperature calculating point of the high temperature heating surface tube panel of the boiler.

5. The method for predicting the wall temperature deviation of the high temperature heating surface tube panel of the boiler according to claim 3, wherein before calculating the wall temperature deviation coefficient of the high temperature heating surface tube panel of the boiler using the wall temperature deviation coefficient formula in the boiler simulation model, the method further comprises:

obtaining the temperature calculating points of the pipeline in the furnace of the boiler.

6. An apparatus for predicting a wall temperature deviation of a high temperature heating surface tube panel of a boiler, applied to a combustion system of a coal-fired generating unit, wherein the apparatus comprises: a processor and a memory, wherein the memory configured to store program codes, and transmit the program codes to the processor; and the program codes, when executed by the processor, to cause the processor to obtain operating data of the combustion system of the coal-fired generating unit; and select, from the operation data, data affecting the wall temperature deviation of the high temperature heating surface tube panel of the boiler, as factor data;

establish a three-dimensional boiler simulation model in CFD software according to the factor data and a structure of the boiler, and calculate swirl intensity at a furnace outlet of the boiler using a swirl momentum moment formula in the boiler simulation model;

calculate a wall temperature deviation coefficient of the high temperature heating surface tube panel of the boiler using a wall temperature deviation coefficient formula in the boiler simulation model;

perform a quadratic fit on the swirl intensity and the wall temperature deviation coefficient, to obtain a predicting model of the wall temperature deviation of the high temperature heating surface tube panel of the boiler; and use the factor data and the swirl intensity of the boiler, as an input of the predicting model, and obtain an output of the predicting model as the wall temperature deviation of the high temperature heating surface tube panel of the boiler; and control an operation of the combustion system of the coal-fired generating unit based on the wall temperature deviation of the high temperature heating surface tube panel of the boiler, to avoid an overtemperature on a tube wall of the boiler.

7. The apparatus for predicting the wall temperature deviation of the high temperature heating surface tube panel of the boiler according to claim 6, wherein the program codes, when executed by the processor, to cause the processor to express the swirl intensity at the furnace outlet of the boiler by a swirl momentum moment, wherein the swirl momentum moment formula is:

$$P = \left[\sum_{i=1}^{n_1}\rho u_x^2 \Delta x \Delta HL_x + \sum_{j=1}^{n_2}\rho u_z^2 \Delta z \Delta HL_z\right]/2$$

wherein $\rho$ is a density of flue gas flowing through a furnace of the boiler, $u_x$ is a tangential velocity of the flue gas along an x-axis direction in a boiler simulation model, $u_z$ is a tangential velocity of the flue gas along a z-axis direction in the boiler simulation model, $\Delta x$ is a distance of measuring points of the furnace of the boiler along the x-axis direction, $\Delta z$ is a distance of the measuring points of the furnace of the boiler along the z-axis direction, $\Delta H$ is a unit length of the furnace of the boiler, $L_{x'}$ is a distance between the measuring point of the furnace of the boiler and a center of the furnace of the boiler along the x-axis direction, $L_x$ is a distance between the measuring point of the furnace of the boiler and the center of the furnace of the boiler along the z-axis direction, $n_1$ is the number of measuring points along the x-axis direction, and $n_2$ is the number of measuring points along the z-axis direction.

8. The apparatus for predicting the wall temperature deviation of the high temperature heating surface tube panel of the boiler according to claim 6, wherein the wall temperature deviation coefficient formula is:

$$M_T = \frac{T_{ave} + 3\sqrt{\frac{1}{N-1}\sum_{i=1}^{N}(T_i - T_{ave})^2}}{T_{ave}}$$

wherein $T_{ave}$ is an average value of outer wall temperatures at N temperature calculating points of the high temperature heating surface tube panel of the boiler, $T_i$ is an outer wall temperature at an i-th temperature calculating point of the high temperature heating surface tube panel of the boiler, N is the number of temperature calculating points, and $M_T$ is the wall temperature deviation coefficient of the high temperature heating surface tube panel of the boiler.

9. The apparatus for predicting the wall temperature deviation of the high temperature heating surface tube panel of the boiler according to claim 6, wherein before the wall temperature deviation coefficient of the high temperature heating surface tube panel of the boiler is calculated using the wall temperature deviation coefficient formula in the boiler simulation model, the program codes, when executed by the processor, to cause the processor to:

calculate an outer wall temperature of the high temperature heating surface tube panel of the boiler using an outer wall temperature calculating formula, wherein the outer wall temperature calculating formula is:

$$T = t_f + J_n \frac{\beta}{\alpha_2} q_w + \overline{J} q_w \frac{\delta}{\lambda} \frac{2\beta}{\beta+1}$$

wherein $t_f$ is a temperature of working substance at the temperature calculating point in the furnace of the boiler, $J_n$, is a heat current-sharing coefficient of an inner wall of a pipeline in the furnace of the boiler, $\beta$ is a ratio of an outer diameter to an inner diameter of the pipeline in the furnace of the boiler, $q_w$ is a heat flow density of an outer wall at the temperature calculating point of the furnace of the boiler, $\alpha_2$ is a heat transfer coefficient between the inner wall of the pipeline and the working substance at the temperature calculating point of the furnace of the boiler, $\overline{J}$ is an average heat flow current-sharing coefficient of the pipeline in the furnace of the boiler along a thickness direction of the pipeline, $\delta$ is a thickness of a wall of the pipeline in the furnace of the boiler, $\lambda$ is a metal thermal conductivity coefficient of the wall of the pipeline in the furnace of the boiler, and T is an outer wall temperature at the temperature calculating point of the high temperature heating surface tube panel of the boiler.

10. The apparatus for predicting the wall temperature deviation of the high temperature heating surface tube panel of the boiler according to claim 8, wherein before the wall temperature deviation coefficient of the high temperature heating surface tube panel of the boiler is calculated using the wall temperature deviation coefficient formula in the boiler simulation model, the program codes, when executed by the processor, to cause the processor to:

obtain the temperature calculating points of the pipeline in the furnace of the boiler.

\* \* \* \* \*